Feb. 9, 1926.  
H. I. SMITH  
1,572,370  
AUTOMATIC CLUTCH CONTROL FOR MOTOR VEHICLES  
Filed August 25, 1924
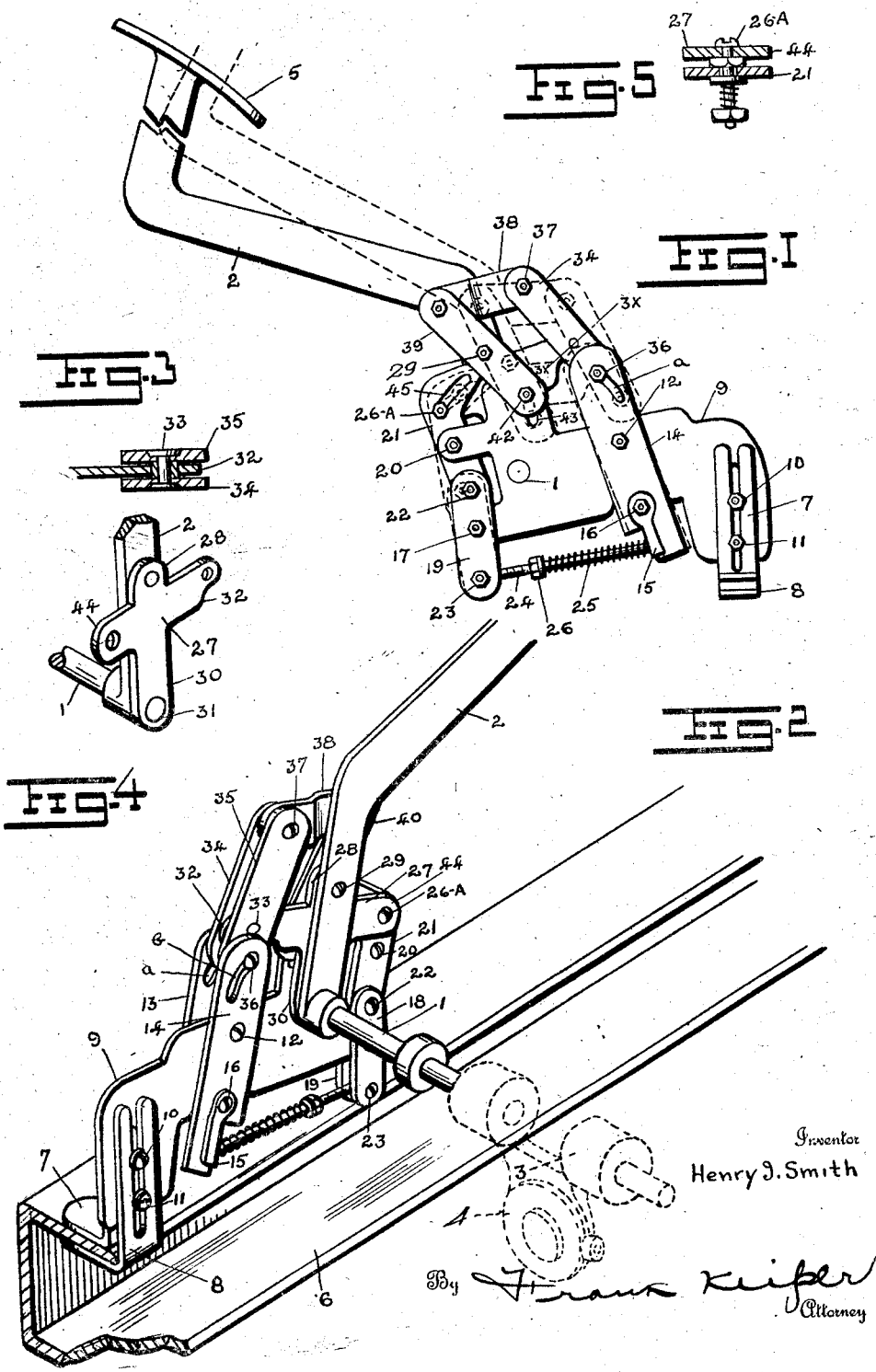
Inventor  
Henry J. Smith  
By Frank Keifer  
Attorney Patented Feb. 9, 1926.

1,572,370

UNITED STATES PATENT OFFICE.

HENRY I. SMITH, OF GAINESVILLE, NEW YORK, ASSIGNOR OF ONE-HALF TO GEORGE W. REYNOLDS, OF ROCK GLEN, NEW YORK.

AUTOMATIC CLUTCH CONTROL FOR MOTOR VEHICLES.

Application filed August 25, 1924. Serial No. 733,980.

*To all whom it may concern:*

Be it known that I, HENRY I. SMITH, a citizen of the United States, residing at Gainesville, in the county of Wyoming and State of New York, have invented certain new and useful Improvements in Automatic Clutch Controls for Motor Vehicles, of which the following is a specification.

The object of this invention is to provide a new and improved form of clutch control to regulate the movement of the moving member of the clutch into engagement so as to make the clutch close deliberately and prevent its closing quickly thus preventing the grabbing effect which is frequently present in the normal operation of the clutch of automobiles.

Another object of the invention is to provide an apparatus that can be used in connection with the clutches and clutch levers that are now regularly in use in automobiles, and that can be installed in an automobile in connection with and without disturbing the apparatus that is already present.

This and other objects of the invention will be fully illustrated in the drawings, described in the specification and pointed out in the claims at the end thereof.

In the drawings:

Figure 1 is a side elevation of the clutch control as it would appear assembled with the clutch lever and the rock shaft.

Figure 2 is a perspective view of the control mechanism assembled with the clutch connection lever, and rock shaft, a portion of the frame also being shown.

Figure 3 is a section on the line 3×—3× of Figure 1.

Figure 4 is a detail view of the four arm plate 27.

Figure 5 is a detail view of the bolt that passes through the cam slot 45 and puts a friction on the plate 21.

In the drawings like reference numerals indicate like parts.

In the drawing reference numeral 1 indicates the rock shaft on which is keyed the clutch lever 2. On the rock shaft 1 is the yoke 3 which engages with the moving member 4 of the clutch by which it is moved into and out of engagement on the movement of the clutch lever 2. 5 indicates the pedal or foot plate on the clutch lever on which the foot rests to move the lever. These features are all old in the motor vehicle art and constitute no part of my invention, it being understood that my invention can be applied to any of the existing types of automobile clutches whether they are disc or cone clutches without interfering with the normal operation of them, the control mechanism being intended to permit the normal or regular operation of the clutch, but prevent the abnormal or hasty operation of the clutch. In other words it is intended to secure the closing of the clutch in a way that will insure the smooth, steady starting of the car without a jerk instead of starting the car with a jerk. In the drawings reference numeral 6 indicates a member of the frame of the car on which are mounted the brackets 7 and 8. The bracket 7 engages on top of the frame member and the bracket 8 engages under the frame member. The uprights of these two brackets are suitably spaced apart so as to engage between them the plate 9. The uprights of the brackets 7 and 8 are slotted and the plate 9 is also slotted and the uprights and the plate are fastened together by bolts 10 and 11 by which the plate 9 is clamped therein at any desired elevation. By means of the two bolts the plate is held against rotation. A bolt 12 passes through the plate 9 and on this bolt are pivoted the plates 13 and 14 which comprise a lever, the plates 13 and 14 being plated on opposite sides of the plate 9. The plates 13 and 14 are held together at the bottom by a yoke 15 which is held in place by a bolt 16 which passes through the plate 9. The forward end of the plate 9 is provided with an opening in which is supported the bolt 17 on which swing the plates 18 and 19. It is also provided with an opening in which is supported the bolt 20 on which swings the plate 21. The plates 18 and 19 are connected at their upper end to the plate 21 by the bolt 22. The plates 18 and 19 and the plate 21 make a compound lever. The plates 18 and 19 at their lower end are provided with a bolt 23 which is engaged by the link 24, the other end of which engages with an opening in the yoke 15. A spring 25 is provided on the link 24, one end of which engages against the yoke 15 and the other end of which is engaged by the nut 26, which is threaded on the link 24 and by turning it, the spring is placed under compression so as to normally hold the plates 13 and 14 and the plates 18 and 19 apart at the bottom to the desired extent. A bolt 26^A is provided which passes through an opening in the plate 21. On this bolt is pivoted the four arm plate 27. The upwardly extending arm 28 of this plate is fastened to the clutch lever by the bolt 29. The downwardly extending arm 30 has a center 31 therein that is intended to be kept concentric with the rock shaft 1 and may be secured thereto or to the clutch lever 2 in any desired manner to secure this result. It will thus be seen that the plate 27 oscillates with the clutch lever and as the clutch lever moves to the right in Figure 2 the lever or plate 21 swings to the right at the top and to the left at the bottom, causing a corresponding movement in the plates or levers 18 and 19.

The arm 32 of plate 27 is perforated and is provided with a bolt 33 that engages with the plates 34 and 35 so that as the plate 27 swings with the lever 2 the plates 34 and 35 move to correspond. Between the plates 34 and 35 is provided a bushing that spaces the plates apart and prevents binding on the arm 32. At the lower end of the plates 34 and 35 is provided an opening which supports a bolt 36 which passes through the curved slots a and b in the plates 13 and 14 which slots are concentric with the center of the shaft 1. At the top of the plates 34 and 35 is carried a bolt 37 on which is pivotally mounted the plate 38. At the opposite end the plate 38 connects the plates 39 and 40 which plates are pivoted at 29 to the upper arm of the plate 27. At the lower end these plates are joined by a bolt 42 that slides in the slot 43 of the plate 9.

It will be seen that when the clutch lever 2 is moved the plates 39 and 40, link 38, plates 34 and 35 and the four arm plate 27 will swing with it. The plate 27 will oscillate around the center of the shaft 1, the pivot pin or bolt 36 will travel in the slots in the plates 13 and 14 which slots are concentric with the shaft 1 and the lower ends of the plates 39 and 40 will move up and down being guided for this purpose by a bolt 42 which connects them and travels in a slot 43 in the plate 9. The arm 44 of the plate 27 is provided with a bolt 26^A which is guided in this movement by a cam slot 45 in the plate 21 which cam slot will be curved and pitched to secure the desired friction according to the requirements of the particular type of clutch to which the control mechanism is applied. On the bolt 26^A is provided a spring which is put under compression by a nut.

When the lever is depressed as above explained the spring 25 is placed under compression and forces the lower ends of the plates 14 and 18 apart and these plates in turn are moved toward each other at the top. The plates 18 and 19 in turn swing the plate 21 on the center 20 so that the top of the plate 21 swings away from the top of the plate 14. The expansion of the spring 25 takes up all the lost motion of the parts and holds them in their proper uniform relation with each other. It also holds the parts in the proper relation so as to cause the necessary friction at the cam slot 45 and the concentric slots a and b in the plates 13 and 14 which retard the movement of the parts and in turn control the movement of the clutch. In the operation of the device, it is pointed out that when the pedal is depressed the levers 19 and 21 are rocked in a direction that will allow the spring 25 to expand. In this way the spring will not oppose the movement of the pedal but actually assist it. After the pedal has been depressed and is released the levers 19 and 21 are opposed on their return motion by the resistance offered by the spring on the compression thereof. Because of this the cam slot 45 is held with a yielding pressure eccentrically to the path of movement of the stud 26^A carried by the lever 27. This provides an increased frictional contact of the stud 26^A in the cam slot that resists a quick return of the stud in the slot and in turn retards the movement of the pedal to its normal position in which the clutch members operated by the pedal engage each other.

Because of the fact that in depressing the pedal the lever 21 containing the cam slot 45 is moved in the same direction in which the expansion spring tends to move this same lever no resistance is offered to the movement of the stud 26^A and the lever on which it is mounted. In this way no resistance is offered to the pedal by the apparatus when disengaging the clutch but sufficient resistance is offered on the return movement of the pedal to make it move slowly and allow the clutch to engage gradually and not grab quickly.

It has also been found that by the use of this control device with the delayed closing of the clutch caused thereby when the gears are shifted from low speed to intermediate or high or vice versa the engine and the gear will be brought into proper step so that they will close easily and without grinding before slipping into engagement.

It will also be understood that there is a spring in the clutch of every car that closes the clutch when the driver's foot releases the lever. The friction device controlled by the spring 25 makes the clutch close slowly and retards the action of the spring in the clutch. If the spring 25 is compressed enough it will create friction enough to stop the clutch just short of closing and let the clutch slip or make it slip and if the nut 26 is turned back a turn or two the friction will decrease enough to allow the spring of the clutch to slowly close the clutch with just enough slip to properly start the car.

It will also be understood that different cars have different strength of springs in the clutch and the nut 26 can be adjusted to throw the right compression on the spring 25 to make the clutch close properly in each car, the adjustment of the spring 25 varying with each car and with the strength of the spring already in the clutch in the car.

It will also be understood that this device can be used with any type of clutch. With the cone clutch, with its strong tendency to grab the spring 25 must be placed under more compression then when used with the multiple disk clutch.

I claim:

1. In a clutch control device, the combination of a stationary plate adapted to be fastened to the frame of a car, a swinging plate adapted to be attached to the clutch lever of a car, plates attached to said swinging plate and pivoted to said stationary plate and to each other, one of said plates having a slot therein concentric with the pivot of the clutch lever, another plate having a cam slot therein, said swinging plate having a pin engaging in said cam slot and causing the third named plates to make frictional engagement therewith whereby the swinging of the clutch lever is retarded, and a spring for moving said plate with said cam slot in one direction.

2. In a clutch control device, the combination of a swinging plate adapted to be fastened to and move with the clutch lever, a second swinging plate having a guide slot therein concentric with the pivot of the clutch lever, a third swinging plate having a cam slot therein, a stationary plate having a guide slot therein, bolts movable with said first named swinging plate and engaging in said slots, and means for causing a friction between the cam slot and the bolt moving therein to retard the movement of the first named plate.

3. In a clutch control device, the combination of a swinging plate adapted to be fastened to and move with the clutch lever, a second swinging plate having a guide slot therein concentric with the pivot of the clutch lever, a third swinging plate having a cam slot therein, a stationary plate having a guide slot therein, bolts movable with said first named swinging plate and engaging in said slots, means for causing a friction between the cam slot and the bolt moving therein to retard the movement of the first named plate, and means for moving the plates having the cam slot and the concentric slot in the same direction to increase the frictional engagement in the cam slot.

4. In a clutch control device, the combination of a swinging plate adapted to be fastened to and move with the clutch lever, a second swinging plate having a guide slot therein concentric with the pivot of the clutch lever, a third swinging plate having a cam slot therein, a stationary plate having a guide slot therein, bolts movable with said first named swinging plate and engaging in said slots, means for causing a friction between the cam slot and the bolt moving therein to retard the movement of the first named plate, means for moving the plates having the cam slot and the concentric slot in the same direction with different leverages to increase the frictional engagement in the cam slot.

5. In a clutch control device, the combination of a stationary plate, a four arm plate adapted to swing with reference thereto with the clutch lever, a compound lever pivoted at two places at one end of said stationary plate, a simple lever pivoted at the other end of the stationary plate having a slot concentric with the pivot of the clutch lever, a cam in the upper end of the compound lever a bolt on a horizontal arm of the four arm plate making frictional engagement with said cam, a lever pivoted to the upper end of said four arm plate and at its lower end making sliding engagement with a slot in the stationary plate, a horizontal link to which it is pivoted at its upper end, a lever pivoted to the other horizontal arm of the four arm plate and pivoted to the link at its upper end, and a bolt on the lower end of said lever engaging with the concentric slot in the simple lever, and a spring for moving said compound lever with said cam slot in one direction.

6. In a clutch control device, the combination of a stationary plate, a four arm plate adapted to swing with reference thereto with the clutch lever, a compound lever pivoted at two places at one end of said stationary plate, a simple lever pivoted at the other end of the stationary plate having a slot concentric with the pivot of the clutch lever, a cam in the upper end of the compound lever, a bolt on a horizontal arm of the four arm lever making frictional engagement with said cam, a lever pivoted to the upper end of said four arm plate and at its lower end making sliding engagement with a slot in the stationary plate, a horizontal link to which it is pivoted at its upper end, a lever pivoted to the other horizontal arm of the four arm plate and pivoted to the link at its upper end, a bolt on the lower end of said lever engaging with the concentric slot in the simple lever, a link between the compound and simple lever at the lower ends thereof, and a spring thereon tending to force them apart.

In testimony whereof I affix my signature.

HENRY L. SMITH.